US012810525B2

(12) United States Patent
Levallois et al.

(10) Patent No.: US 12,810,525 B2
(45) Date of Patent: Nov. 24, 2026

(54) GENERATING TEXTURED VIEWS FOR A THREE-DIMENSIONAL REPRESENTATION

(71) Applicant: Adobe Inc., San Jose, CA (US)

(72) Inventors: Jérémy Nicolas Levallois, Lyons (FR); Robin Faury, Clermont-Ferrand (FR); Lois Paulin, Paris (FR); Jean Marc Christian Marie Thiery, Paris (FR); Axel Paris, Paris (FR); Simon Perche, Saint-Rémy (FR)

(73) Assignee: Adobe Inc., San Jose, CA (US)

( * ) Notice: Subject to any disclaimer, the term of this patent is extended or adjusted under 35 U.S.C. 154(b) by 195 days.

(21) Appl. No.: 18/900,777

(22) Filed: Sep. 29, 2024

(65) Prior Publication Data

US 2026/0094342 A1 Apr. 2, 2026

(51) Int. Cl.

| | |
|---|---|
| ***G06T 15/04*** | (2011.01) |
| ***G06T 3/18*** | (2024.01) |
| ***G06T 17/20*** | (2006.01) |

(52) U.S. Cl.

CPC ................ *G06T 15/04* (2013.01); *G06T 3/18* (2024.01); *G06T 17/20* (2013.01)

(58) Field of Classification Search

CPC ............ G06T 15/04; G06T 17/20; G06T 9/00

See application file for complete search history.

(56) References Cited

U.S. PATENT DOCUMENTS

| | | | | |
|---|---|---|---|---|
| 2012/0235988 A1* | 9/2012 | Karafin | ................ | H04N 13/261 345/419 |
| 2024/0112394 A1* | 4/2024 | Neal | ........................ | G06T 15/10 |
| 2024/0135511 A1* | 4/2024 | Singh | .................... | G06F 3/0482 |
| 2024/0144578 A1* | 5/2024 | Kim | ........................ | G06T 15/04 |

OTHER PUBLICATIONS

Cao, Tianshi, et al., "TexFusion: Synthesizing 3D Textures with Text-Guided Image Diffusion Models", Cornell University, arXiv.org, [retrieved from the internet on Nov. 25, 2024], <https://arxiv.org/pdf/2310.13772>, Oct. 20, 2023, 20 pages.

Chen, Dave Zhenyu, et al., "Text2Tex: Text-driven Texture Synthesis via Diffusion Models", Cornell University, arXiv.org, [retrieved from the internet on Nov. 25, 2024], <https://arxiv.org/pdf/2303.11396>, Mar. 20, 2023, 15 pages.

Geyer, Michal, et al., "TokenFlow: Consistent Diffusion Features for Consistent Video Editing", Cornell University, arXiv Preprint, arxiv.org [retrieved Feb. 1, 2024]. Retrieved from the Internet <https://arxiv.org/pdf/2307.10373.pdf>, Jul. 19, 2023, 13 pages.

(Continued)

*Primary Examiner* — Ming Wu

(74) *Attorney, Agent, or Firm* — FIG. 1 Patents

(57) ABSTRACT

In implementation of techniques for generating textured views for a three-dimensional representation, a computing device implements a texture system to receive a three-dimensional representation of an object. The texture system generates maps based on the three-dimensional representation that include encoded geometry information for the object. By decoding the encoded geometry information from the maps using a machine learning model, the texture system generates a set of textured views of the object. The texture system then displays the set of textured views of the object in a user interface.

20 Claims, 10 Drawing Sheets

(56) References Cited

OTHER PUBLICATIONS

Guérin, Eric, et al., “Interactive Example-Based Terrain Authoring with Conditional Generative Adversarial Networks”, ACM Transactions on Graphics, vol. 36, No. 6, Article 228, [retrieved from the internet on Nov. 25, 2024], <https://hal.science/hal-01583706/file/tog.pdf>, Sep. 28, 2017, 14 pages.

Hecong, Wu, “ControlLoRA Version 2: A Lightweight Neural Network To Control Stable Diffusion Spatial Information Version 2”, github.com, [retrieved from the internet on Nov. 25, 2024], <https://github.com/HighCWu/control-lora-v2>, 2024, 5 pages.

Jakob, Wenzel, et al., “Mitsuba 3 Physically Based Renderer”, [retrieved from the internet on Nov. 25, 2024], <https://mitsuba-renderer.org/>, 2022, 1 page.

Kang, Minguk, et al., “Scaling Up GANs for Text-to-Image Synthesis”, Proceedings of the IEEE/CVF Conference on Computer Vision and Pattern Recognition (CVPR), 2023, 11 pages.

Kerbl, et al., “3D Gaussian Splatting for Real-Time Radiance Field Rendering”, ACM Transactions on Graphics 42, 4, Jun. 2023, 14 pages.

Lee, Yuseung, et al., “SyncDiffusion: Coherent Montage via Synchronized Joint Diffusions”, Cornell University, arXiv.org, [retrieved from the internet on Nov. 25, 2024], <https://arxiv.org/pdf/2306.05178>, Oct. 29, 2023, 27 pages.

Metzer, Gal, et al., “Latent-NeRF for Shape-Guided Generation of 3D Shapes and Textures”, Cornell University, arXiv.org, [retrieved from the internet on Oct. 25, 2024], <https://arxiv.org/pdf/2211.07600>, Nov. 14, 2022, 11 pages.

Mildenhall, Ben, et al., “NeRF: Representing Scenes as Neural Radiance Fields for View Synthesis”, Cornell University arXiv, arXiv.org [retrieved Mar. 19, 2023]. Retrieved from the Internet <https://arxiv.org/pdf/2003.08934.pdf>., Aug. 3, 2020, 25 Pages.

Pineda, Juan, “A Parallel Algorithm for Polygon Rasterization”, Computer Graphics, vol. 22, No. 4, Aug. 1988, [retrieved from the internet on Nov. 25, 2024], <https://dl.acm.org/doi/pdf/10.1145/54852.378457>, Aug. 1988, 4 pages.

Richardson, Elad, et al., “TEXTure: Text-Guided Texturing of 3D Shapes”, Cornell University, arXiv.org, [retrieved from the internet on Nov. 25, 2024], <https://arxiv.org/pdf/2302.01721>, Feb. 3, 2023, 13 pages.

Rombach, Robin, et al., “High-Resolution Image Synthesis with Latent Diffusion Models”, Cornell University arXiv, arXiv.org [retrieved Aug. 11, 2023]. Retrieved from the Internet <https://arxiv.org/pdf/2112.10752.pdf>., Apr. 13, 2022, 45 Pages.

Vicini, Delio, et al., “Differentiable Signed Distance Function Rendering”, ACM Trans. Graph., vol. 41, No. 4, Article 125, [retrieved from the internet on Nov. 25, 2024], <https://rgl.s3.eu-central-1.amazonaws.com/media/papers/Vicini2022sdf_1.pdf>, Jul. 2022, 18 pages.

Yifan, Wang, et al., “Geometry-Consistent Neural Shape Representation With Implicit Displacement Fields”, Cornell University, arXiv.org, [retrieved from the internet on Nov. 25, 2024], <https://arxiv.org/pdf/2106.05187>, Feb. 2, 2022, 20 pages.

Zhang, Lvmin, et al., “Adding Conditional Control to Text-to-Image Diffusion Models”, Cornell University, arXiv Preprint, arxiv.org [retrieved Nov. 10, 2023]. Retrieved from the internet <https://arxiv.org/pdf/2302.05543.pdf>, Feb. 10, 2023, 12 pages.

* cited by examiner

GENERATING TEXTURED VIEWS FOR A THREE-DIMENSIONAL REPRESENTATION

BACKGROUND

In computer graphics, a three-dimensional representation is a virtual model of an object in a three-dimensional space. For instance, the three-dimensional representation is a mesh that is a collection of nodes, edges, and faces that define a geometry of the object. Meshes are used to represent and render objects for a variety of applications, including video games, virtual reality, alternate reality, computer-aided design, and animation. For example, connections between the nodes, the edges, and the faces define shapes of surfaces and an overall structure of the mesh for presentation of the object. However, rendering meshes in real-life scenarios causes errors and results in visual inaccuracies, computational inefficiencies, and increased power consumption in real world scenarios.

SUMMARY

Techniques and systems for generating textured views for a three-dimensional representation are described. In an example, a texture system receives a three-dimensional representation of an object. For example, the three-dimensional representation is a mesh.

The texture system generates maps based on the three-dimensional representation, the maps including encoded geometry information for the object. In some examples, maps include at least one of a depth map, a normal map, or a position map. The encoded geometry information specifies depths for individual pixels of the three-dimensional representation of the object.

By decoding the encoded geometry information from the maps using a machine learning model, the texture system generates a set of textured views of the object. For example, the machine learning model is a diffusion model, and a texture of the set of textured views is defined by depth information decoded from the maps by the machine learning model.

The texture system then displays the set of textured views of the object in a user interface. In some examples, the texture system combines the set of textured views into a concatenated textured image and generating content for in-painting gaps between textured views of the concatenated textured image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
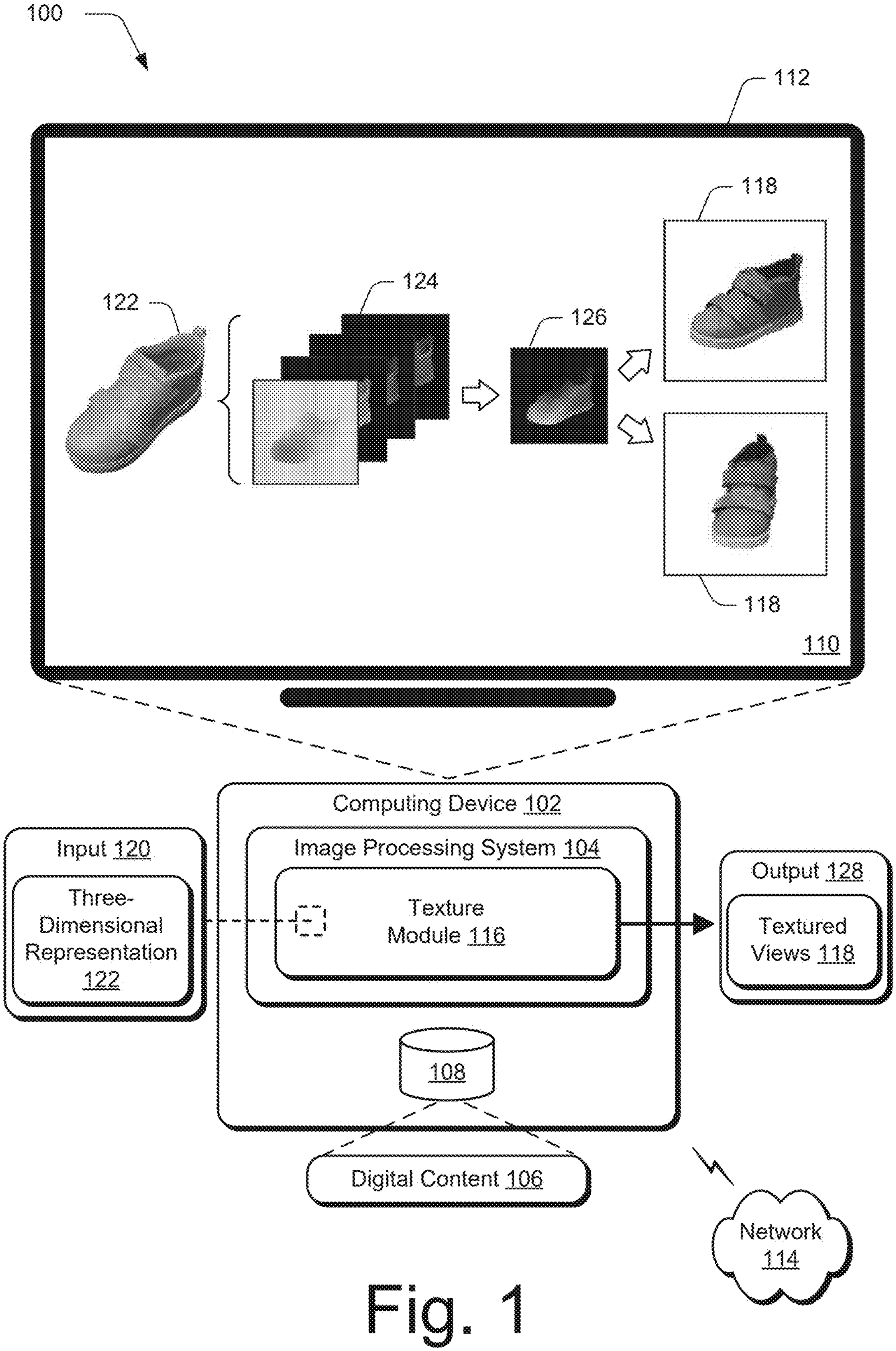
FIG. 1 is an illustration of a digital medium environment in an example implementation that is operable to employ techniques and systems for generating textured views for a three-dimensional representation as described herein.

Meshes, which are three-dimensional representations of objects, are rendered in user interfaces for a variety of applications, including video games, virtual reality, alternate reality, computer-aided design, and animation. However, meshes typically have a finite resolution, and textures incorporated on the meshes include unwanted artifacts, making the meshes unsuitable for rendering realistic objects. For instance, the meshes lack realistic texture or other features related to pixel depth on surfaces of the mesh. While diffusion models are used to increase image resolution and apply texture to two-dimensional surfaces, these models do not successfully apply texture directly to meshes because the meshes are three-dimensional. Therefore, conventional mesh editing techniques involve users manually applying texture to the meshes, which results in inaccurate application of texture to portions of the mesh.

Techniques and systems are described for generating textured views for a three-dimensional representation that overcome these limitations. A texture system begins in this example by receiving a mesh or other three-dimensional representation depicting an object. One or more maps are generated that correspond to a given viewpoint of the mesh, including a depth map, a normal map, or a position map. The maps, for instance, include encoded geometry information related to surfaces of the object depicted by the mesh, including information specifying depths of individual pixels of surfaces of the object. This example is not limited to the depth map, the normal map, or the position map, however, and other maps including encoded geometry information are used in other examples. By decoding the geometry information from the maps, a diffusion model generates a set of textured views of the object. Unlike conventional mesh editing techniques, the diffusion model is conditioned on the geometry information, resulting in the diffusion model accurately applying texture to surfaces of the mesh to generate the set of textured views. The textured views, for instance, depict a surface of the object from an individual viewpoint and feature realistic texture and a higher level of resolution than the mesh.

In an example, a texture system begins by receiving an input including a three-dimensional representation of a leather sofa. The three-dimensional representation is a mesh designed for application in a virtual environment for a video game. However, surfaces of the three-dimensional representation are composed of polygons that form vertices, edges, and faces of the object, and therefore the three-dimensional representation is a rudimentary version of the leather sofa. For instance, the three-dimensional representation does not accurately depict leather grain, stitching, and other textures that are present on a real-world leather sofa. To render the three-dimensional representation in a user interface for the video game, additional texture is desired for the three-dimensional representation to give the leather sofa a life-like appearance.

The texture system computes maps from the three-dimensional representation that include encoded geometry information related to depths of pixels, indicating texture of the leather sofa that is absent from the three-dimensional representation. In this example, the maps include a depth map, a normal map, a position map, and a world-view map based on the three-dimensional representation. However, other examples involve a single map or a different combination of maps. The depth map is a grayscale image indicating distances from pixels of the leather sofa to a camera. The normal map indicates vectors perpendicular to a tangent plane of the surface of the leather sofa at a certain point. The position map encodes three-dimensional positions of points on the surface of the leather sofa on a three-dimensional model. The world-view map encodes positions and orientations of the surfaces of the leather sofa relative to the camera as coordinates.

The texture system then decodes the maps by calculating a warping for the leather sofa. The warping, for instance, indicates how pixels of the three-dimensional representation wrap around surfaces of the depicted leather sofa. To calculate the warping, the texture system forms a pseudo-mesh of triangles in a three-dimensional form of the leather sofa based on information from the maps. The warping therefore indicates the geometry information, including geometrical features and other attributes of the leather sofa specified by depths of in individual pixels of the three-dimensional representation of the object.

The texture system then uses a diffusion model to generate textured views of the leather sofa. Because the geometry information indicated by the warping specifies depths for individual pixels of the three-dimensional representation of the object, the texture system conditions the diffusion model on the geometry system. For instance, the geometry information informs the diffusion model on curved or other complex features of the surface of the object to accurately rasterize and apply texture to the surfaces of the object of the three-dimensional representation. The diffusion model, for instance, transforms input data from the three-dimensional representation and the geometry information through denoising into the textured views for display in the user interface. The textured views of the leather sofa, for instance, are individual images depicting the leather sofa with incorporated texture, depicted from individual viewpoints. The textured views in this example depict realistic leather grain and stitching that mimics a real-world leather sofa and is therefore suitable for rendering in the video game.

In some implementations, the textured views are combined to create a concatenated textured image of the object that is a three-dimensional, textured counterpart to the input mesh. For instance, the texture system stitches the individual textured views together in three-dimensions to form the concatenated textured image. In some examples, the texture system leverages a generative machine learning model to generate content to in-paint gaps between the textured views to generate a concatenated textured image that is realistic and cohesive. In this example, the textured views of the leather sofa are stitched together in three-dimensions to form a concatenated textured image that presents a complete view of the textured sofa.

Generating textured views for a three-dimensional representation in this manner overcomes the limitations of conventional mesh editing techniques that involve manually applying texture to three-dimensional meshes. For example, conditioning a diffusion model on geometry information decoded from maps based on the three-dimensional representation results in accurate application of texture to surfaces of the three-dimensional representation, including on curves, corners, and other complex features the surfaces. This allows for accurate generation of textured views, which is not accomplished using conventional techniques that involve manual application of texture. For these reasons, generating textured views for a three-dimensional representation is more efficient and less prone to human error than conventional mesh editing techniques.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques and systems for generating textured views for a three-dimensional representation described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), an augmented reality device, and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 10.

The computing device 102 also includes an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable entirely or partially via functionality available via the network 114, such as part of a web service or "in the cloud."

The computing device 102 also includes a texture module 116 which is illustrated as incorporated by the image processing system 104 to process the digital content 106. In some examples, the texture module 116 is separate from the image processing system 104 such as in an example in which the texture module 116 is available via the network 114.

The texture module 116 is configured to generate textured views 118. For example, the texture module 116 first receives an input 120 including a three-dimensional representation 122. The three-dimensional representation 122, for instance, is a mesh that represents an object in a virtual three-dimensional space. In this example, the object is a shoe. Because the three-dimensional representation 122 is a mesh that lacks texture, a textured version of the three-dimensional representation 122 is desired. Portions of the shoe, including the straps and the sole, lack texture and therefore appear unrealistic.

After receiving the three-dimensional representation 122, the texture module 116 generates maps 124 that include encoded geometry information from the three-dimensional representation 122. In this example, the maps 124 include a depth map, a normal map, a position map, and a world-view map. This example is not limited to the depth map, the normal map, the position map, and the world-view map, however, and other maps including encoded geometry information are used in other examples. The depth map is a data representation that conveys distance of surfaces of the object in a scene from a particular viewpoint, which is a camera viewpoint in this example. The normal map is a data representation that stores information related to surface normals of the object in the scene, which are vectors perpendicular to the surface of the object. The position map encodes three-dimensional positions of points on the surface of the object on a three-dimensional model. The world-view map encodes positions and orientations of the surfaces of the object relative to the camera.

The texture module 116 then extracts geometry information 126 from the maps 124 by decoding the encoded geometry information. To do this, a machine learning model interprets individual pixels of the maps 124, which indicate geometrical relationships between the individual pixels. In some examples, the texture module 116 computes a warping for the object that indicates the geometrical relationships and three-dimensional features of the object, which is explained in further detail with respect to FIG. 5. The texture module 116 leverages the geometry information 126 to generate the textured views 118 using a diffusion model. For example, the geometry information 126 is input into the diffusion model. Because the geometry information 126 describes features of the surface of the object, the informs the diffusion model while rasterizing the three-dimensional representation to generate the textured views 118. The textured views 118, for instance, have a higher resolution than corresponding views of the three-dimensional representation 122.

The texture module 116 then generates an output 128 including the textured views 118, further examples of which are described in the following sections and shown in corresponding figures. The textured views 118 are individual points of view of the object depicted in the three-dimensional representation 122 with enhanced texture and detail.

In some examples, the texture module 116 combines the textured views 118 together into a concatenated textured image. To do this, the texture module 116 uses a generative machine learning model to generate content to in-paint gaps between the textured views 118, resulting in a concatenated textured image with uniform construction. The concatenated textured image is a textured counterpart to the three-dimensional representation 122 that has a higher level of resolution and is more aesthetically-pleasing when rendered on the user interface 110. For example, the concatenated textured image depicts the shoe from the three-dimensional representation 122, but with a higher level of resolution and texture. Additionally, the texture of the textured views 118 is consistent across the camera views of the object. For instance, the leather straps of the shoe and the sole of the shoe include realistic texture on the concatenated textured image.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Generating Textured Views for a Three-Dimensional Representation

Figure 2:
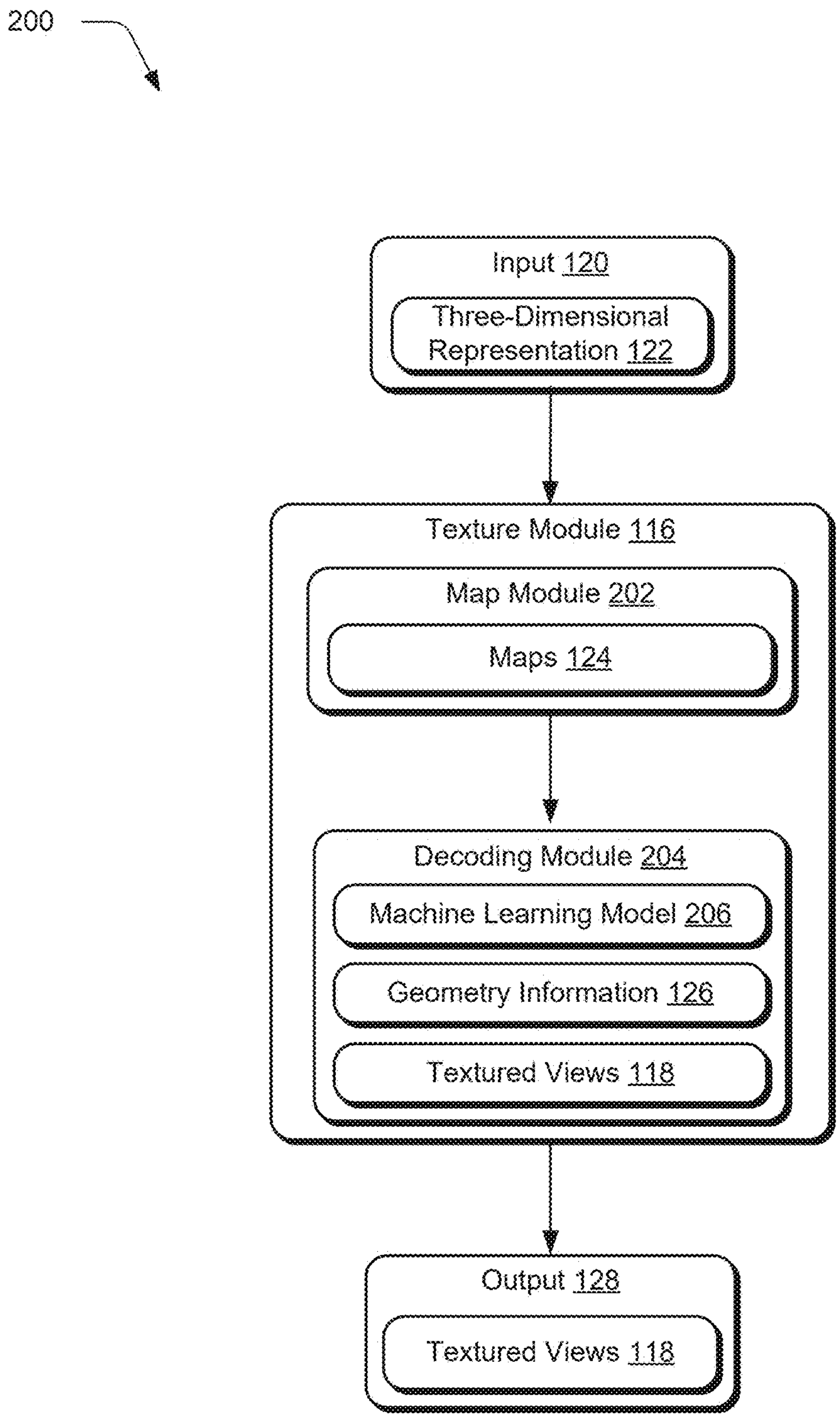
FIG. 2 depicts a system in an example implementation showing operation of a texture module for generating textured views for a three-dimensional representation.

FIG. 2 depicts a system 200 in an example implementation showing operation of the texture module 116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-10.

To begin in this example, a texture module 116 receives an input 120 including a three-dimensional representation 122. The three-dimensional representation 122 is a mesh or other virtual model of an object represented in a three-dimensional space. A mesh, for instance, models a surface of the object and is composed of polygons that form vertices, edges, and faces of the object.

The texture module 116 includes a map module 202. The map module 202 generates maps 124 based on the three-dimensional representation 122. In this example, the texture module 116 computes a depth map, a normal map, a position map, and a world-view map based on the three-dimensional representation 122. The depth map is a grayscale image corresponding to a distance to a camera. The normal map indicates vectors perpendicular to a tangent plane of the surface of the object at a certain point. The position map encodes three-dimensional positions of points on the surface of the object on a three-dimensional model. The world-view map encodes positions and orientations of the surfaces of the object relative to the camera in coordinates. This example is not limited to the depth map, the normal map, the position map, and the world-view map, however, and other maps including encoded geometry information are used in other examples.

The texture module 116 also includes a decoding module 204. The decoding module 204 decodes the maps 124 using a machine learning model 206, which is a diffusion model in this example. During the decoding, the decoding module 204 extracts geometry information 126 from the maps 124. To do this, the decoding module 204 calculates a warping of the object based on information from the maps 124. The warping, for instance, indicates the geometry information 126, including geometrical features and other attributes of the object. The geometry information 126 specifies depths for individual pixels of the three-dimensional representation 122 of the object.

The decoding module 204 uses the geometry information 126 to generate textured views 118 of the object. For instance, the geometry information 126 informs a diffusion model on curved or other complex features of the surface of the object to accurately apply texture to the surfaces. The diffusion model, for instance, models a process involving transforming data from a simple, known distribution including into the desired complex distribution, which includes the textured views 118 in this example. For example, the texture of the textured views 118 is defined by depth information decoded from the maps 124. The texture module 116 then generates an output 128 including the textured views 118 for display in the user interface.

FIGS. 3-6 depict stages of generating textured views for a three-dimensional representation. In some examples, the stages depicted in these figures are performed in a different order than described below.

Figure 3:
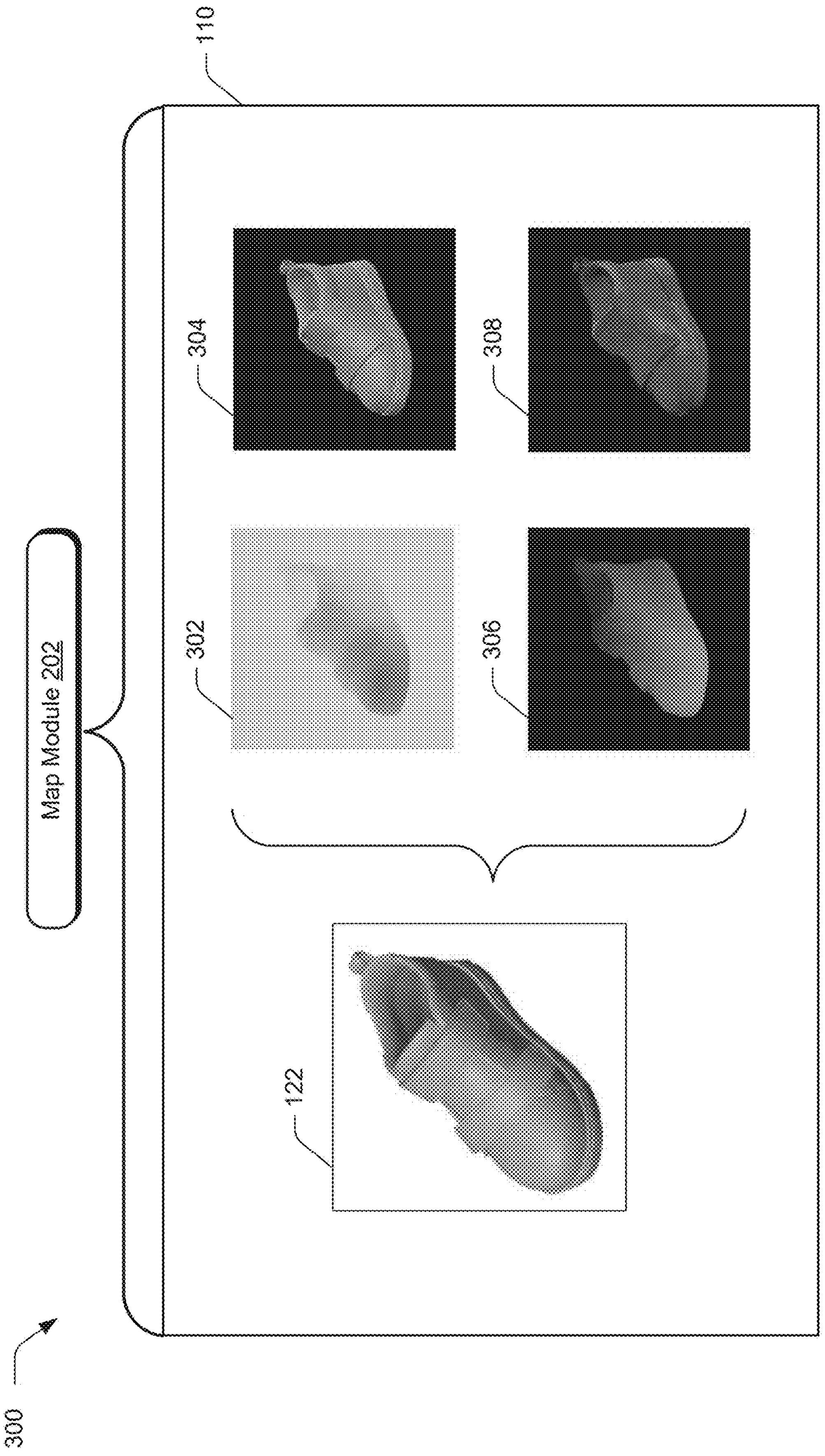
FIG. 3 depicts an example of generating maps from a three-dimensional representation.

FIG. 3 depicts an example 300 of generating maps from a three-dimensional representation. As illustrated, a map module 202 of the texture module 116 receives an input 120 including a three-dimensional representation 122 of an object, which is a shoe in this example.

Using graphics processing unit (GPU) buffers, the map module 202 generates maps 124 from the three-dimensional representation 122. The GPU buffer computes the maps 124 by storing and processing data from the three-dimensional representation 122 to process the maps 124, including a depth map 302, a normal map 304, a position map 306, and a world-view map 308. The data, which includes vertex positions, surface normals, and texture coordinates, is stored in buffers including Vertex Buffer Objects (VBOs) or Texture Buffers. When rendering, the GPU accesses these buffers to perform calculations in parallel across thousands of threads, applying shaders that transform the raw data into the maps 124.

For the depth map 302, the GPU calculates distances of vertices from the camera and stores the values in a buffer, which is then used to generate a final image of the depth map 302. The depth map 302 is a grayscale image with pixels corresponding to the distance to the camera. The decoding module 204, for instance, leverages the depth map 302 for generation of the textured views 118.

For the normal map 304, the map module 202 processes the vertex normals stored in the buffers to produce red, green, blue (RGB) values that represent a surface orientation of the three-dimensional representation 122. The normal map 304 indicates vectors perpendicular to a tangent plane of the surface of the object at a certain point, indicated by camera coordinates. The decoding module 204, for instance, leverages the normal map 304 for computing warping for the object depicted in the three-dimensional representation 122.

For the position map 306, the map module 202 stores and processes the three-dimensional positional data of vertices of the three-dimensional representation 122 and transforms the data into a two-dimensional map that represents the positions of the vertices relative to the camera. The position map 306 encodes three-dimensional positions of points on the surface of the object on a three-dimensional model. The decoding module 204, for instance, leverages the normal map 304 for computing warping for the object depicted in the three-dimensional representation 122.

For the world-view map 308, the map module 202 stores and processes the three-dimensional positional data of vertices of the three-dimensional representation 122 and transforms the data into a two-dimensional map that represents the positions of the vertices relative to the world or environment relative to the camera. The world-view map 308 encodes positions and orientations of the surfaces of the object relative to the camera in spatial coordinates. The decoding module 204, for instance, leverages the normal map 304 for computing warping for the object depicted in the three-dimensional representation 122.

In some examples, the map module 202 generates a canny map corresponding to the object depicted in the three-dimensional representation 122. The canny map presents outlines of the object, emphasizing structure and shapes of the object. The decoding module 204, for instance, leverages the canny map for generation of the textured views 118.

Figure 4:
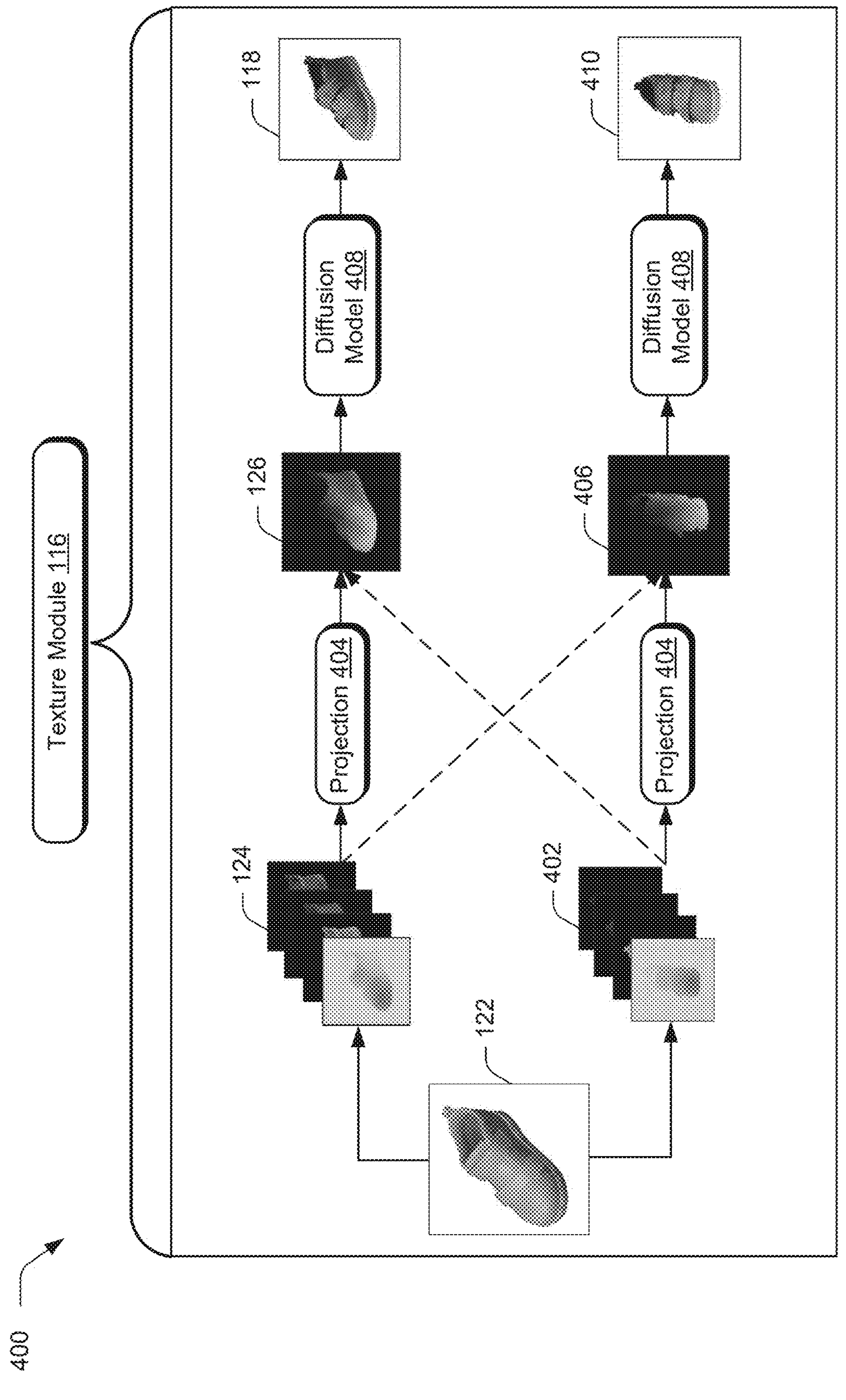
FIG. 4 depicts an example of an architecture for generating textured views for the three-dimensional representation.

FIG. 4 depicts an example 400 of an architecture for generating textured views for the three-dimensional representation. In this example, the texture module 116 receives an input 120 including a three-dimensional representation 122. The three-dimensional representation 122 is a mesh or other virtual model of an object represented in a three-dimensional space. A mesh, for instance, models a surface of the object and is composed of polygons that form vertices, edges, and faces of the object.

The map module 202 of the texture module 116 generates maps 124 from the three-dimensional representation 122. Because the maps 124 are two-dimensional, the maps 124 correspond to a first view of the object of the three-dimensional representation 122. In this example, the map module 202 also generates additional maps 402 from the three-dimensional representation 122 that correspond to a second view of the object of the three-dimensional representation 122. In this example, the maps 124 and the additional maps 402 include a depth map 302, a normal map 304, a position map 306, and a world-view map 308. The depth map 302 is a grayscale image corresponding to a distance to a camera. The normal map 304 indicates vectors perpendicular to a tangent plane of the surface of the object at a certain point. The position map 306 encodes three-dimensional positions of points on the surface of the object on a three-dimensional model. The world-view map 308 encodes positions and orientations of the surfaces of the object relative to the camera in coordinates. This example is not limited to the depth map 302, the normal map 304, the position map 306, and the world-view map 308, however, and other maps including encoded geometry information are used in other examples.

The decoding module 204 of the texture module 116 then decodes the maps 124 and the additional maps 402 by computing a warping for the views of the maps 124 and the additional maps 402. The warping, for instance, indicates the geometry information 126, including geometrical features and other attributes of the object. The geometry information 126 specifies depths for individual pixels of the three-dimensional representation 122 of the object. Computing the warping is discussed in further detail with respect to FIG. 5. For example, the texture module 116 performs a projection 404 on the maps 124, computing the warping for the view of the maps 124 based on the maps 124 and the additional maps 402. Additionally, the texture module 116 performs the projection 404 on the additional maps 402, computing the warping for the view of the additional maps 402 based on the maps 124 and the additional maps 402. Because the warping for the maps 124 and the additional maps 402 is informed by the maps 124 and the additional maps 402, the texture module 116 extracts geometry information 126 corresponding to the maps 124 and informed by the additional maps 402, in addition to additional geometry information 406 corresponding to the additional maps 402 and informed by the maps 124.

The decoding module 204 uses a diffusion model 408 to perform a diffusion process on the geometry information 126 and the additional geometry information 406 to generate textured views 118 and additional textured views 410 of the object of the three-dimensional representation 122. The textured views 118 correspond to the view of the maps 124, and the additional textured views 410 correspond to the view of the additional maps 402. For instance, the geometry information 126 and the additional geometry information 406 informs the diffusion model 408 on curved or other complex features of the surface of the object to accurately apply texture to the surfaces.

The diffusion model 408, for instance, refines an initial noisy image into the textured views 118 and the additional textured views 410 based on the geometry information 126 and the additional geometry information 406. The diffusion model 408 is iteratively refined through a series of steps, during which the model uses the textured views 118 and the additional textured views 410 to guide the transformation. Over multiple iterations, the diffusion model denoises and sharpens the image, progressively revealing a realistic view of the object for the textured views 118 and the additional textured views 410 that is consistent with the three-dimensional representation 122 with the addition of texture. For example, the texture of the textured views 118 is defined by depth information decoded from the maps 124, and the texture of the additional textured views is defined by depth information decoded from the additional maps 402.

Figure 5:
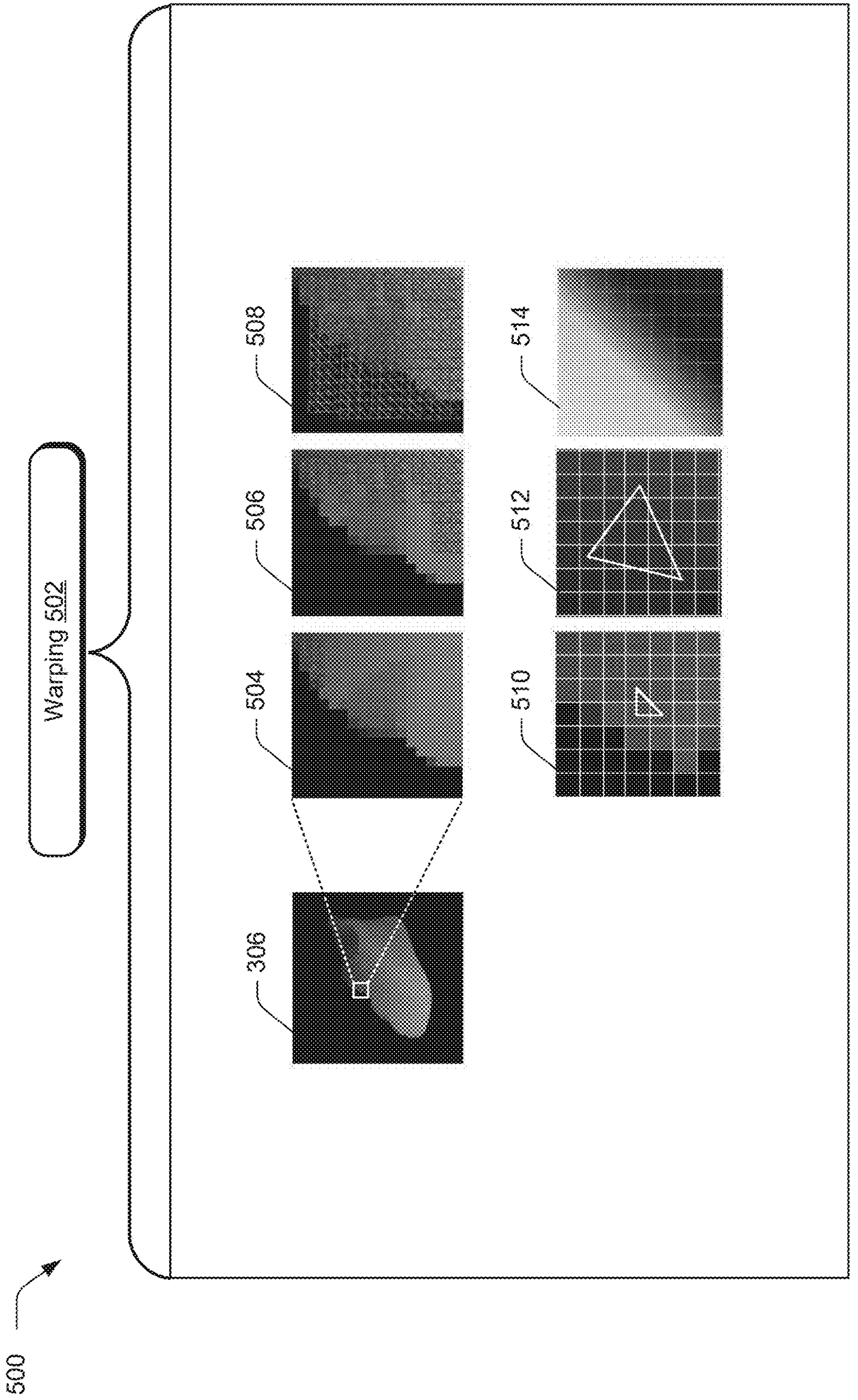
FIG. 5 depicts an example of warping a map to form a textured view.

FIG. 5 depicts an example 500 of warping a map to form a textured view. FIG. 5 is a continuation of the example described in FIG. 4. After the map module 202 of the texture module 116 generates maps 124 from the three-dimensional representation 122, the decoding module 204 of the texture module 116 then decodes the maps 124 and the additional maps 402 by computing a warping 502 for the views of the maps 124 and the additional maps 402.

To compute the warping 502, the decoding module 204 generates a pseudo-mesh 504 for application to a map of the maps 124. In this example, the decoding module 204 generates a pseudo-mesh for application to the position map 306. Individual pixels are connected their neighbor pixels to the right and below, creating triangles 506. A full triangulation mesh 508 of the position map 306 is created by connecting the triangles 506 with their neighbor triangles to the left and above the triangles 506. The full triangulation mesh 508 is projected onto the camera space as a grid.

The decoding module 204 obtains a grid mesh of a specific view point 510 and deforms it into another point of view. For points of view $v_0$, $v_1$ and $v_{0\rightarrow 1}$ the triangles of $v_0$ are projected into $v_1$. The decoding module 204 performs corner projection 512 on the triangles onto $v_1$ by taking the position from the position map 306 of $v_0$ and searching for the closest position into the $v_1$ position map. If the Euclidean distance is greater than a defined threshold, the point is discarded.

If corners of the triangle are discarded, the triangle is skipped. To determine whether a triangle is discarded, multiple thresholds are defined, including: a) distorted triangles if area and parameters of the triangle are larger than a threshold size, b) dot products between the original point and reprojection to determine a surface related to the normal direction, or c) a dot product of the view camera vector and original point to remove borders.

After computing the projection, the decoding module 204 computes a bounding box b by taking $x_{min}$ and $y_{min}$ of the corners $p_0$, $p_1$ and $p_2$ to rasterize the triangle. The decoding module 204 then computes the edge function of each pixel $p_i$ inside b with each edge. This edge function is equivalent to the cross product between $p_i-p_0$ and $p_1-p_0$. The decoding module 204 repeats this operation with $p_1$ and $p_2$., $p_i$ is located inside the triangle if the products of all of these equations are all positive or all negative.

To project previous generations, the decoding module 204 computes the weights of each pixel to triangle vertices to produce smooth shading inside the triangle. The cross product of two edges defines the area of the corresponding parallelogram and thus, half of this quantity is equal to the area of the triangle. Given $p_i$, three triangles inside the original triangle and the sum of their area is equal to the sum of the original triangle. By taking the opposite triangle to a vertex, the area defines the weight of the vertex. The decoding module 204 divides the area of the whole triangle to get normalized weights. This results in barycentric coordinates for computation of triangle interpolation 514 for the warping 502.

Figure 6:
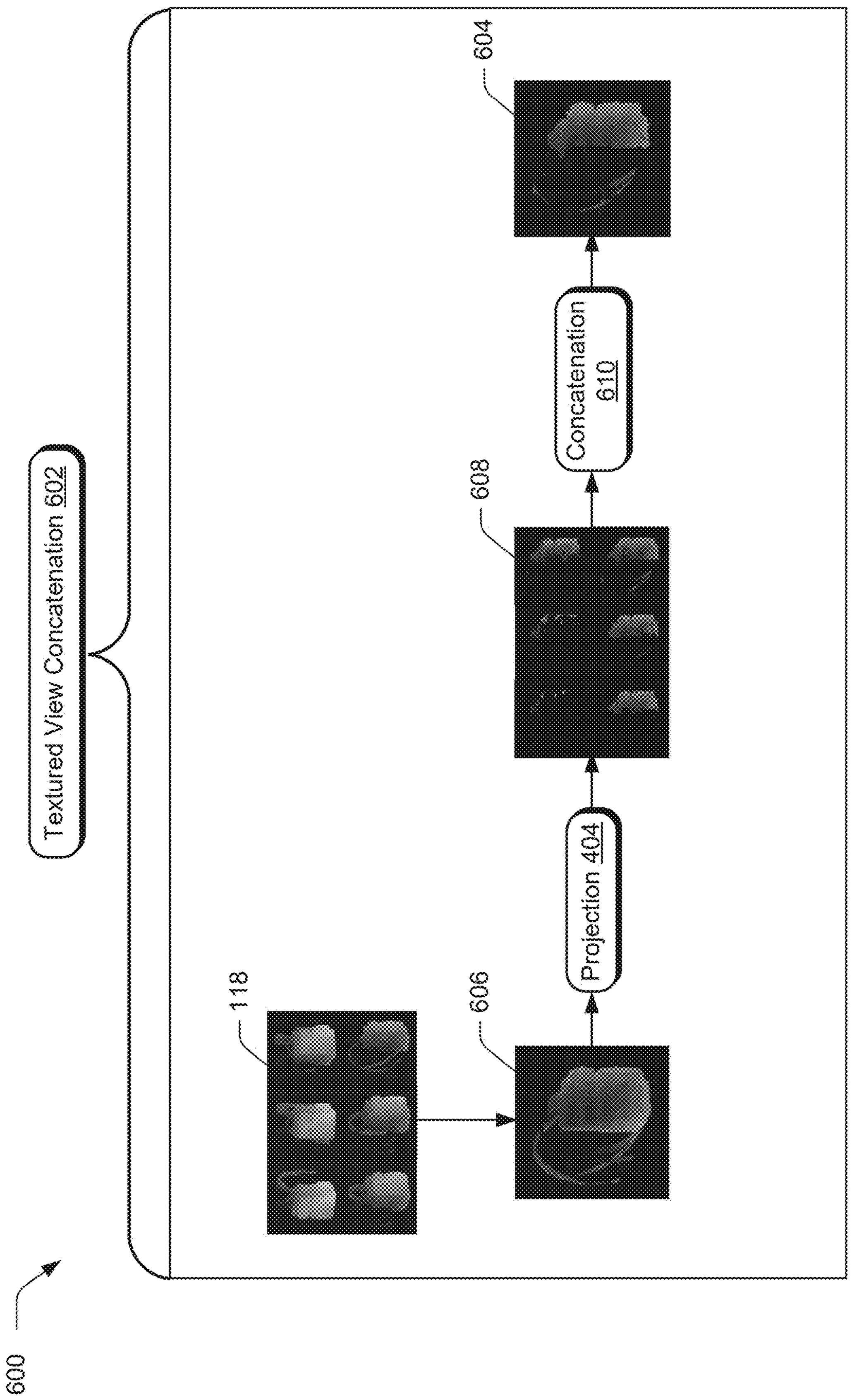
FIG. 6 depicts an example of textured view concatenation.

FIG. 6 depicts an example 600 of textured view concatenation. FIG. 6 is a continuation of the example described in FIG. 4. In some examples, after the texture module 116 generates textured views 118 of the three-dimensional representation 122, the texture module 116 performs view concatenation 602 on the textured views 118 to form a concatenated textured image 604.

As shown, the texture module 116 generates textured views 118 of an object, which is a backpack in this example. The textured views 118 represent individual views based on the three-dimensional representation 122 with additional texture. For instance, the textured views 118 have a higher degree of resolution than the three-dimensional representation 122.

The texture module 116 performs a projection 404 on a current textured view 606, representing a single viewpoint, onto the textured views 118 to generate reprojected textured views 608. In some examples, pixels of the current textured view 606 are combined with pixels of the textured views 118, and duplicate pixels between the current textured view 606 and the textured views 118 are ignored. Because the textured views 118 depict views of a backpack in this example, the concatenated textured image 604 depicts a virtual, three-dimensional backpack formed by concatenating the textured views 118 together.

The texture module 116 then performs concatenation 610 on the reprojected textured views 608 to form the concatenated textured image 604. For example, the concatenated textured image 604 is a composite of the textured views 118 combined together. In some examples, the texture module 116 employs a generative machine learning model to generate content for in-painting gaps between the textured views 118 of the concatenated textured image 604. For instance, the generative machine learning model generates the content for in-painting the gaps by leveraging patterns learned from training on sequences of images. During training, these models extract and understand features such as shapes, textures, and colors, as well as how these features evolve over time. The generative machine learning model interpolates in a latent space, which is a compressed representation of the image data, by determining a candidate transition between the images. The model then synthesizes an image from this interpolated point, resulting in coherence between the images. Examples of the generative machine learning model include Generative Adversarial Networks (GANs) and Variational Autoencoders (VAEs). Once trained, the generative machine learning models are usable for generating the content for in-painting the gaps between the textured views 118 of the concatenated textured image 604.

The texture module 116 presents the concatenated textured image 604 for further editing and/or rendering in the user interface 110. In some examples, for instance, the texture module 116 receives an input specifying an editing operation related to a visual feature of the concatenated textured image 604. In some examples, the concatenated textured image 604 is configured to rotate within a view of the user interface 110 for editing. For instance, a user rotates the backpack in this example by dragging, swiping, or by using other navigation gestures using touch or analog controls to adjust a position or view of the backpack in a virtual three-dimensional environment of the user interface 110. Because the textured views 118 are concatenated together, the textured views 118 are controlled and move or rotate together using a single command by moving or rotating the concatenated textured image 604 in the user interface 110. Further, the concatenated textured image 604 is configured for editing during rotation in the user interface 110.

In this example, the texture module 116 receives an indication selecting a visual portion of the backpack specifying a specific virtual material for editing. Because the concatenated textured image 604 is configured to rotate, the user rotates the concatenated textured image 604 and selects a visual portion of the backpack depicting the virtual material and specifies a different virtual material and color for the mesh area. The texture module 116, for instance, is configured in some examples to identify portions of the concatenated textured image 604 corresponding to the virtual material and to adjust pixels corresponding to the virtual material. The texture module 116 then generates an updated concatenated textured image based on the editing operation and renders the updated concatenated textured image in the user interface 110. Because the concatenated textured image 604 has a higher level of resolution than the three-dimensional representation 122, the concatenated textured image 604 allows for editing with a higher attention to detail than the three-dimensional representation 122.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-6.

Figure 7:
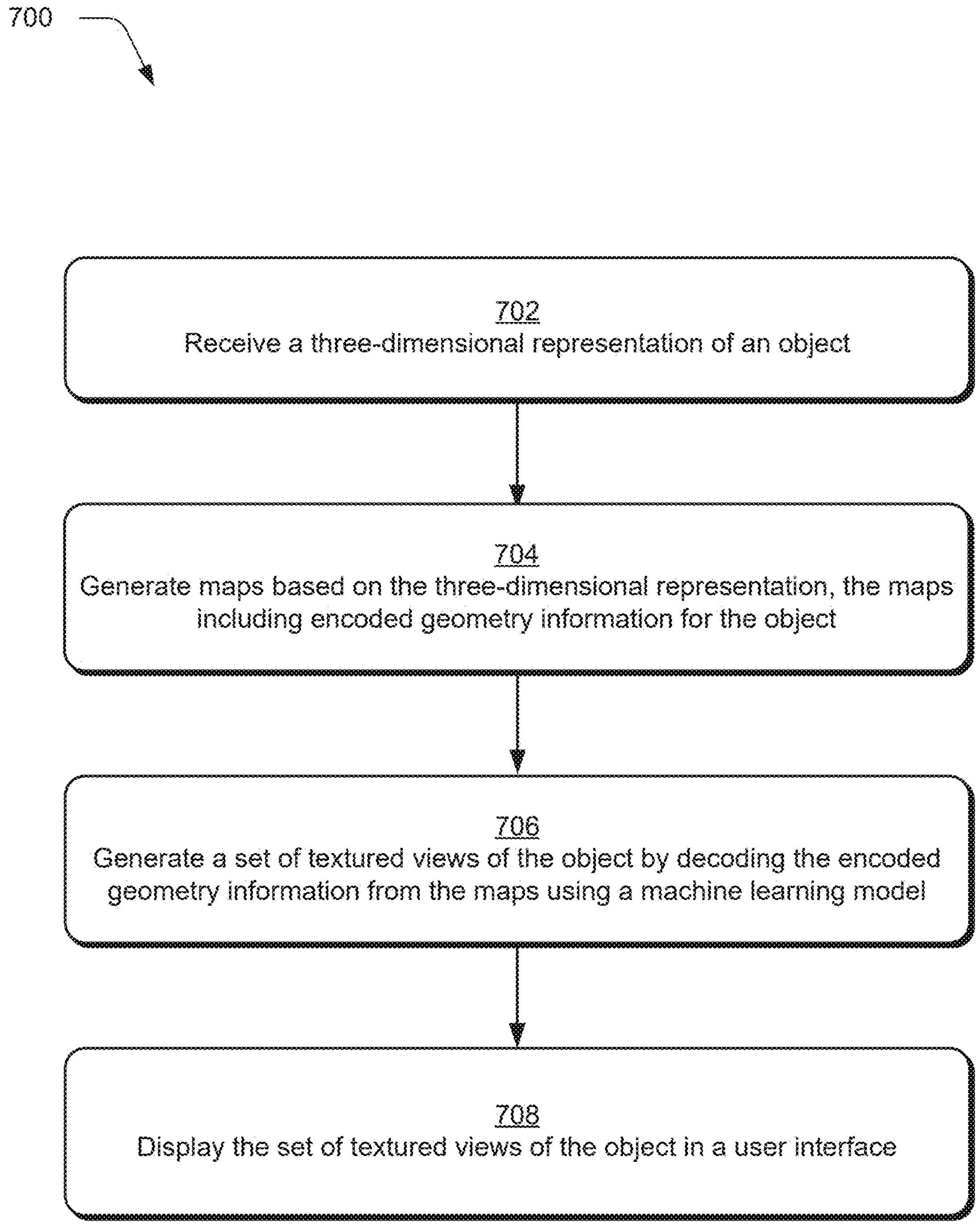
FIG. 7 depicts a procedure in an example implementation of generating textured views for a three-dimensional representation.

FIG. 7 depicts a procedure 700 in an example implementation of generating textured views for a three-dimensional representation. At block 702 a three-dimensional representation 122 of an object is received. For example, the three-dimensional representation 122 is a mesh.

At block 704, maps 124 are generated based on the three-dimensional representation 122, the maps 124 including encoded geometry information for the object. For example, the encoded geometry information specifies depths for individual pixels of the three-dimensional representation 122 of the object. In some examples, the maps 124 include at least one of a depth map 302, a normal map 304, or a position map 306.

At block 706, a set of textured views 118 of the object is generated by decoding the encoded geometry information from the maps 124 using a machine learning model 206. In some examples, the machine learning model 206 is a diffusion model 408.

At block 708, the set of textured views 118 of the object are displayed in a user interface 110. Some examples further comprise combining the set of textured views 118 into a concatenated textured image 604 and generating content for in-painting gaps between textured views 118 of the concatenated textured image 604. Some examples further comprise receiving an input specifying an editing operation related to a visual feature of the concatenated textured image 604, generating an updated concatenated textured image based on the editing operation, and rendering the updated concatenated textured image in the user interface 110. For example, a texture of the set of textured views 118 is defined by depth information decoded from the maps 124 by the machine learning model 206. In some examples, the generating the set of textured views 118 involves generating a grid mesh of the object by calculating warping for portions of the object based on the encoded geometry information. Additionally, some examples further comprise projecting pixels onto a view of the set of textured views 118 based on the warping.

Figure 8:
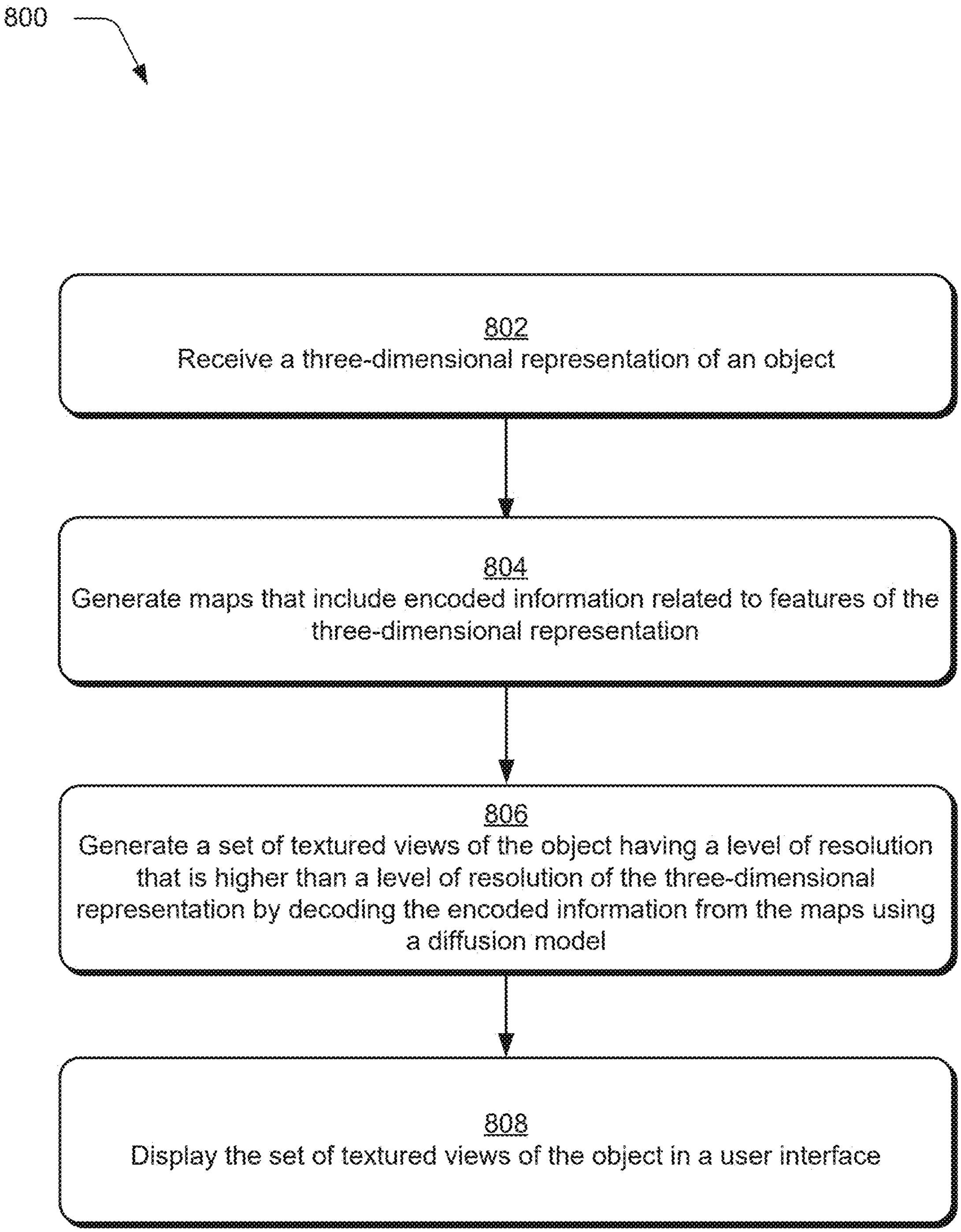
FIG. 8 depicts a procedure in an additional example implementation of generating textured views for a three-dimensional representation.

FIG. 8 depicts a procedure 800 in an additional example implementation of generating textured views for a three-dimensional representation. At block 802, a three-dimensional representation 122 of an object are received.

At block 804, maps 124 are generated that include encoded information related to features of the three-dimensional representation 122. In some examples, the encoded information specifies depths for individual pixels of the three-dimensional representation 122 of the object. In some examples, the maps 124 include at least one of a depth map 302, a normal map 304, or a position map 306. For example, the encoded information defines at least one texture for the set of textured views 118.

At block 806, a set of textured views 118 are generated of the object having a level of resolution that is higher than a level of resolution of the three-dimensional representation 122 by decoding the encoded information from the maps using a diffusion model 408.

At block 808, the set of textured views 118 of the object is displayed in a user interface 110. Some examples further comprise combining the set of textured views 118 into a concatenated textured image 604 and generating content for in-painting gaps between textured views 118 of the concatenated textured image 604. For example, the generating the set of textured views 118 involves generating a grid mesh of the object by calculating warping for portions of the object based on the encoded information. Some examples further comprise projecting pixels onto a view of the set of textured views 118 based on the warping.

Figure 9:
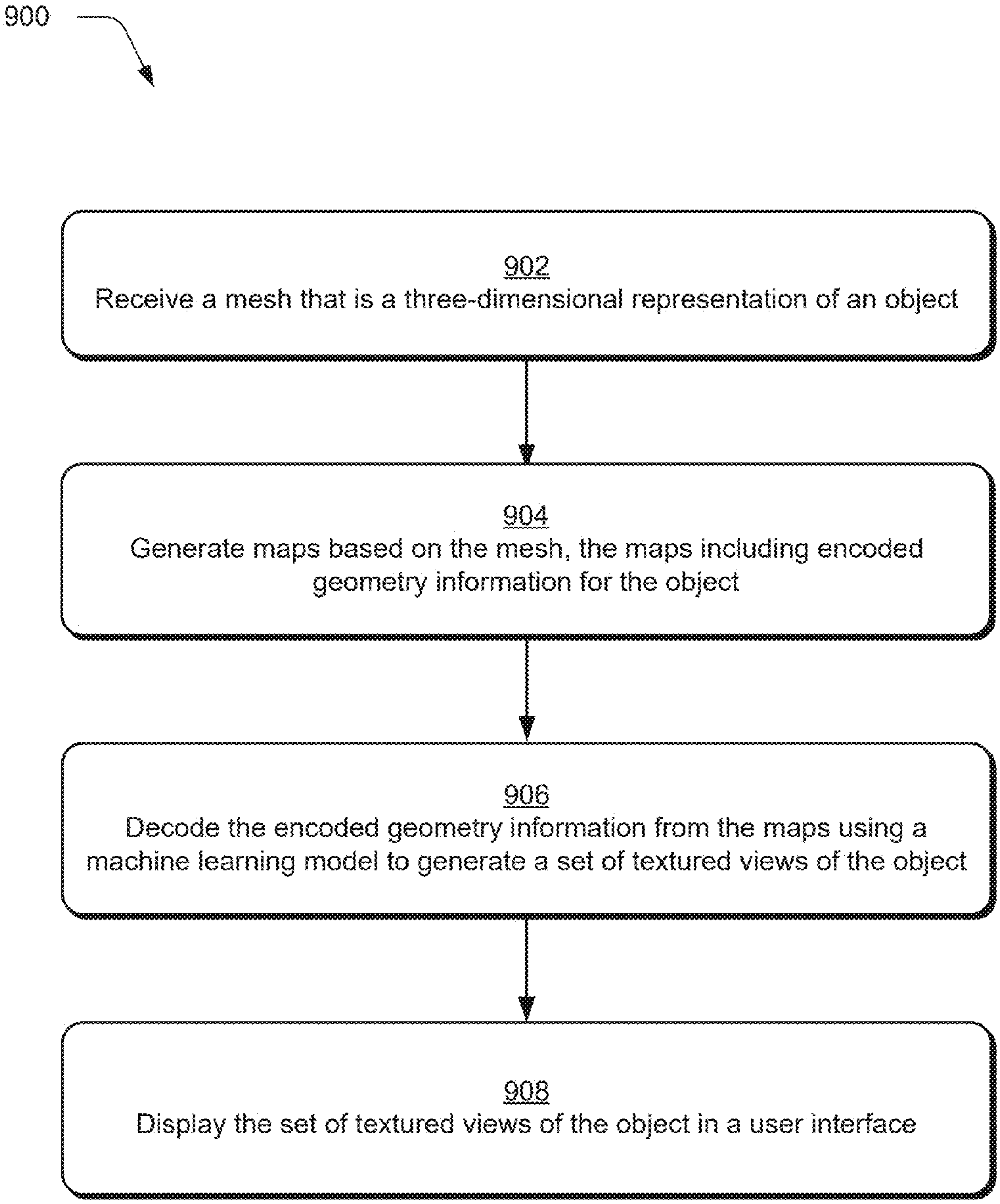
FIG. 9 depicts a procedure in an additional example implementation of generating textured views for a three-dimensional representation.

FIG. 9 depicts a procedure 900 in an additional example implementation of generating textured views for a three-dimensional representation. At block 902, a mesh that is a three-dimensional representation 122 of an object is received.

At block 904, maps 124 are generated based on the mesh, the maps 124 including encoded geometry information for the object. For example, the encoded geometry information specifies depths for individual pixels of the mesh. In some examples, the maps 124 include at least one of a depth map 302, a normal map 304, or a position map 306.

At block 906, the encoded geometry information from the maps 124 is decoded using a machine learning model 206 to generate a set of textured views 118 of the object.

At block 908, the set of textured views 118 of the object is received in a user interface 110. Additionally, some examples further comprise combining the set of textured views 118 into a concatenated textured image 604 and generating content for in-painting gaps between textured views of the concatenated textured image 604.

Example System and Device

Figure 10:
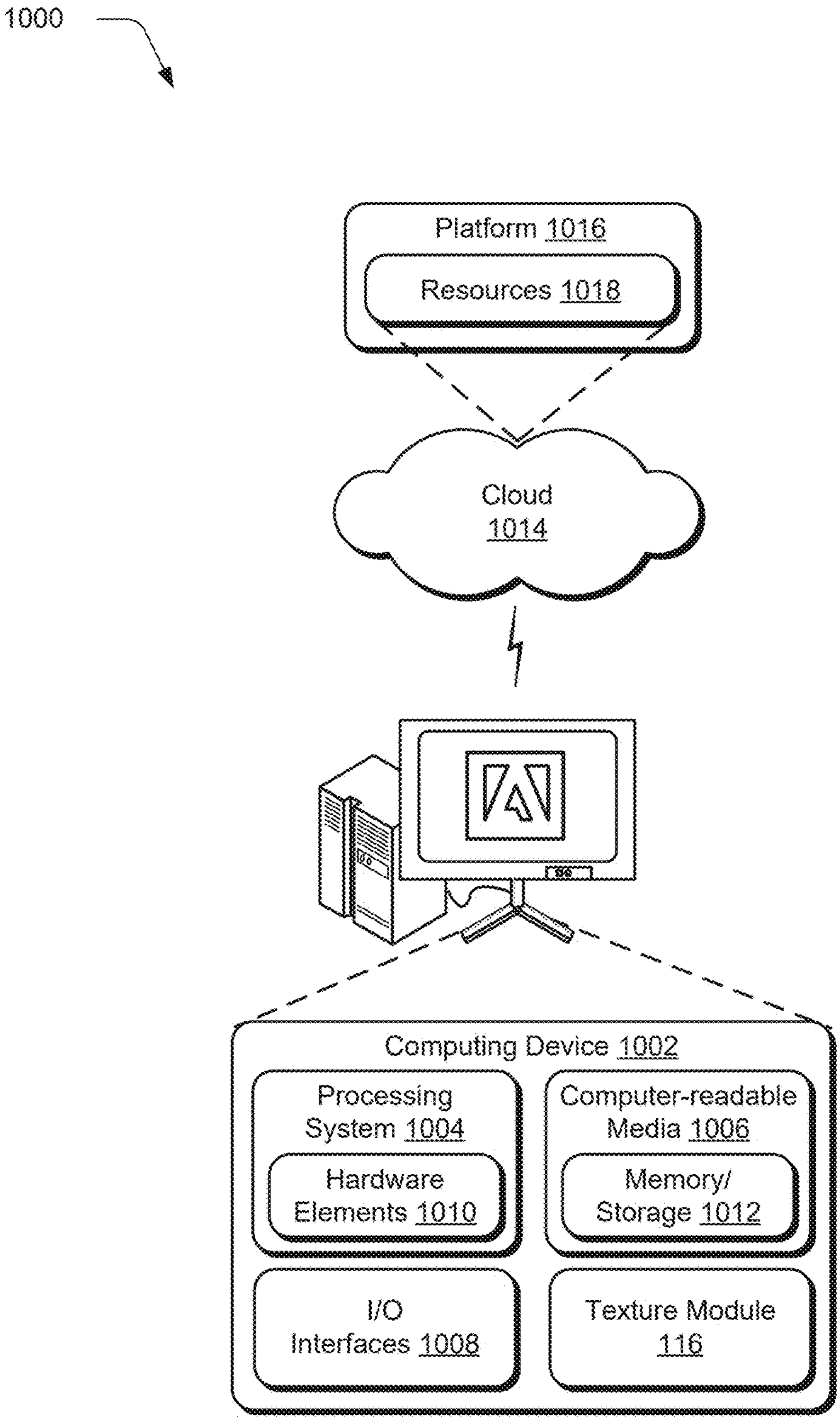
FIG. 10 illustrates an example system including various components of an example device that can be implemented as any type of computing device as described and/or utilized with reference to FIGS. 1-10 to implement embodiments of the techniques described herein.

FIG. 10 illustrates an example system generally at 1000 that includes an example computing device 1002 that is representative of one or more computing systems and/or devices that implement the various techniques described herein. This is illustrated through inclusion of the texture module 116. The computing device 1002 is configurable, for example, as a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that is configurable as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1006 is illustrated as including memory/storage 1012. The memory/storage 1012 represents memory/storage capacity associated with one or more computer-readable media. The memory/storage 1012 includes volatile media (such as random access memory (RAM)) and/or nonvolatile media (such as read only memory (ROM), Flash memory, optical disks, magnetic disks, and so forth). The memory/storage 1012 includes fixed media (e.g., RAM, ROM, a fixed hard drive, and so on) as well as removable media (e.g., Flash memory, a removable hard drive, an optical disc, and so forth). The computer-readable media 1006 is configurable in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1002, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1010. The computing device 1002 is configured to implement particular instructions and/or functions corresponding to the software and/or hardware modules. Accordingly, implementation of a module that is executable by the computing device 1002 as software is achieved at least partially in hardware, e.g., through use of computer-readable storage media and/or hardware elements 1010 of the processing system 1004. The instructions and/or functions are executable/operable by one or more articles of manufacture (for example, one or more computing devices and/or processing systems 1004) to implement techniques, modules, and examples described herein.

The techniques described herein are supported by various configurations of the computing device 1002 and are not limited to the specific examples of the techniques described herein. This functionality is also implementable through use of a distributed system, such as over a "cloud" 1114 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 include applications and/or data that can be utilized when computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributable throughout the system 1000. For example, the functionality is implementable in part on the computing device 1002 as well as via the platform 1016 that abstracts the functionality of the cloud 1014.

What is claimed is:

1. A method comprising:

receiving, by a processing device, a three-dimensional representation of an object;

generating, by the processing device, maps based on the three-dimensional representation, the maps including encoded geometry information for the object including depths of pixels on a surface of the object;

generating, by the processing device, a set of textured views of the object by decoding the encoded geometry information from the maps to compute a warping that indicates how the pixels of the three-dimensional representation wrap around the surface of the object, and using the decoded geometry information to condition a machine learning model to apply texture to the surface of the object; and displaying, by the processing device, the set of textured views of the object in a user interface.

2. The method of claim 1, further comprising combining the set of textured views into a concatenated textured image and generating content for in-painting gaps between textured views of the concatenated textured image, and the content is generated by interpolating between the textured views in a latent space.

3. The method of claim 2, further comprising:

receiving an input specifying an editing operation related to a visual feature of the concatenated textured image;

generating an updated concatenated textured image based on the editing operation; and rendering the updated concatenated textured image in the user interface.

4. The method of claim 1, wherein the maps include at least one of a depth map, a normal map, or a position map.

5. The method of claim 1, wherein a texture of the set of textured views is defined by depth information decoded from the maps by the machine learning model.

6. The method of claim 1, wherein the generating the set of textured views involves generating a grid mesh of the object.

7. The method of claim 6, further comprising projecting the pixels onto a view of the set of textured views based on the warping, and the projecting comprises discarding a point when a Euclidean distance between a position of the point and a closest position in a position map of another viewpoint exceeds a defined threshold.

8. The method of claim 1, wherein the machine learning model is a diffusion model.

9. The method of claim 1, wherein the warping is formed by a mesh of triangles that indicate a higher level of detail than the three-dimensional representation.

10. A non-transitory computer-readable storage medium storing executable instructions, which when executed by a processing device, cause the processing device to perform operations comprising:

receiving a three-dimensional representation of an object;

generating maps that include encoded information related to features of the three-dimensional representation, including depths of pixels on a surface of the object;

generating a set of textured views of the object having a level of resolution that is higher than a level of resolution of the three-dimensional representation by decoding the encoded information from the maps to compute a warping that indicates how the pixels of three-dimensional representation wrap around a geometry of the surface of the object, and using the decoded information to condition a diffusion model to apply texture to the surface of the object based on the geometry of the object; and displaying the set of textured views of the object in a user interface.

11. The non-transitory computer-readable storage medium of claim 10, further comprising combining the set of textured views into a concatenated textured image and generating content for in-painting gaps between textured views of the concatenated textured image.

12. The non-transitory computer-readable storage medium of claim 10, wherein the maps include at least one of a depth map, a normal map, or a position map.

13. The non-transitory computer-readable storage medium of claim 10, wherein the encoded information defines at least one texture for the set of textured views.

14. The non-transitory computer-readable storage medium of claim 10, wherein the generating the set of textured views involves generating a grid mesh of the object by calculating warping for portions of the object based on the encoded information.

15. The non-transitory computer-readable storage medium of claim 14, further comprising projecting the pixels onto a view of the set of textured views based on the warping.

16. The non-transitory computer-readable storage medium of claim 10, wherein the warping is formed by a mesh of triangles that indicate a higher level of detail than the three-dimensional representation.

17. A system comprising:

means for receiving a mesh that is a three-dimensional representation of an object;

means for generating maps based on the mesh, the maps including encoded geometry information for the object including depths of pixels on a surface of the object;

means for decoding the encoded geometry information from the maps to compute a warping that indicates how the pixels of the three-dimensional representation wrap around the surface of the object, and using the decoded geometry information to condition a machine learning model to apply texture to the surface of the object to generate a set of textured views; and means for displaying the set of textured views of the object in a user interface.

18. The system of claim 17, further comprising means for combining the set of textured views into a concatenated textured image and generating content for in-painting gaps between textured views of the concatenated textured image.

19. The system of claim 17, wherein the maps include at least one of a depth map, a normal map, or a position map.

20. The system of claim 17, wherein the warping is formed by a mesh of triangles that indicate a higher level of detail than the three-dimensional representation.

* * * * *